US012463382B2

(12) United States Patent
Little et al.

(10) Patent No.: US 12,463,382 B2
(45) Date of Patent: Nov. 4, 2025

(54) ELECTRICAL CONNECTOR ASSEMBLY HAVING UNITARY GROUND BAR WRAPPING AROUND CABLE WIRES AND METHOD OF MAKING SAME

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Terrance F. Little, Fullerton, CA (US); Patrick R. Casher, North Aurora, IL (US); Richard Lee Malehorn, II, York, PA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 379 days.

(21) Appl. No.: 17/993,935

(22) Filed: Nov. 24, 2022

(65) Prior Publication Data

US 2023/0178937 A1 Jun. 8, 2023

Related U.S. Application Data

(60) Provisional application No. 63/264,546, filed on Nov. 24, 2021.

(51) Int. Cl.

| | |
|---|---|
| *H01R 13/652* | (2006.01) |
| *H01R 13/6596* | (2011.01) |
| *H01R 24/60* | (2011.01) |
| *H01R 43/20* | (2006.01) |
| *H01R 107/00* | (2006.01) |

(52) U.S. Cl.

CPC ....... *H01R 13/652* (2013.01); *H01R 13/6596* (2013.01); *H01R 24/60* (2013.01); *H01R 43/20* (2013.01); *H01R 2107/00* (2013.01)

(58) Field of Classification Search

None

See application file for complete search history.

(56) References Cited

U.S. PATENT DOCUMENTS

| | | | |
|---|---|---|---|
| 6,454,605 | B1 | 9/2002 | Bassler et al. |
| 7,906,730 | B2 | 3/2011 | Atkinson |
| 9,011,177 | B2 | 4/2015 | Lloyd et al. |
| 9,124,009 | B2 | 9/2015 | Atkinson |
| 9,257,778 | B2 | 2/2016 | Buc |
| 9,774,113 | B2 | 9/2017 | Zhang et al. |
| 10,381,767 | B1 | 8/2019 | Milbrand, Jr. et al. |

(Continued)

*Primary Examiner* — Oscar C Jimenez

(74) *Attorney, Agent, or Firm* — Ming Chieh Chang

(57) ABSTRACT

An electrical connector assembly includes: an insulative housing; a contact module received by the insulative housing, the contact module including a first pair of signal contacts, a second pair of signal contacts, and a ground contact between the first pair of signal contacts and the second pair of signal contacts; a first cable having a pair of signal wires terminated to the first pair of signal contacts and a second cable having a pair of signal wires terminated to the second pair of signal contacts; and a unitary ground bar having a first loop wrapping around the first cable, a second loop wrapping around the second cable, and an intermediate portion terminated to the ground contact.

19 Claims, 16 Drawing Sheets

(56) References Cited

U.S. PATENT DOCUMENTS

| | | | | |
|---|---|---|---|---|
| 10,651,606 | B2 | 5/2020 | Little | |
| 10,886,720 | B2 | 1/2021 | Pichlmaier et al. | |
| 2009/0197467 | A1* | 8/2009 | Ko | H01R 13/6592 439/607.28 |
| 2009/0197468 | A1* | 8/2009 | Yu | H01R 4/184 439/607.28 |
| 2015/0079845 | A1* | 3/2015 | Wanha | H01R 13/6477 439/607.41 |
| 2020/0366017 | A1 | 11/2020 | Blackburn et al. | |
| 2021/0234291 | A1* | 7/2021 | Zerebilov | H01R 12/75 |
| 2021/0351536 | A1 | 11/2021 | Chung et al. | |
| 2021/0351547 | A1 | 11/2021 | Little et al. | |

* cited by examiner

ELECTRICAL CONNECTOR ASSEMBLY HAVING UNITARY GROUND BAR WRAPPING AROUND CABLE WIRES AND METHOD OF MAKING SAME

CROSS REFERENCE TO RELATED APPLICATION

This application claims priority to and benefit of U.S. Provisional Patent Application No. 63/264,546, filed Nov. 24, 2021.

BACKGROUND OF THE INVENTION

Field of the Invention

The present invention relates to a ground bar for an electrical connector assembly, and an electrical connector assembly having the ground bar, and a method of making the electrical connector assembly.

Description of Related Arts

U.S. Pat. No. 10,381,767 discloses an electrical connector assembly including a corrugated plate that is shaped to make contact with tails of ground contacts thereof. The corrugated plate provides shielding in the vicinity of tails of signal contacts for radiation emanating from or incident on signal wires of cables from an upper direction and a similar corrugated plate may be attached from below, effectively providing shielding on both sides of the signal wires and the signal contact tails. U.S. Pat. No. 9,257,778 discloses and shows in FIG. 28 thereof a compression shield in cooperation with a ground plate to compress ground jackets of cable.

SUMMARY OF THE INVENTION

An electrical connector assembly comprises: an insulative housing; a contact module received by the insulative housing, the contact module including a first pair of signal contacts, a second pair of signal contacts, and a ground contact between the first pair of signal contacts and the second pair of signal contacts; a first cable having a pair of signal wires terminated to the first pair of signal contacts and a second cable having a pair of signal wires terminated to the second pair of signal contacts; and a unitary ground bar having a first loop wrapping around the first cable, a second loop wrapping around the second cable, and an intermediate portion terminated to the ground contact.

A method of making an electrical connector assembly comprises the steps of: forming a contact module to have a first pair of signal contacts, a second pair of signal contacts, and a ground contact between the first pair of signal contacts and the second pair of signal contacts; terminating a unitary ground bar having a first loop, a second loop, and an intermediate portion therebetween to the ground contact; and inserting a first cable having a pair of first signal wires through the first loop and terminating the pair of first signal wires to the first pair of signal contacts and inserting a second cable having a pair of second signal wires through the second loop and terminating the pair of second signal wires to the second pair of signal contacts.

A unitary ground bar for an electrical connector assembly which includes a first pair of signal contacts, a second pair of signal contacts, a ground contact between the first pair of signal contacts and the second pair of signal contacts, a first cable having a pair of signal wires terminated to the first pair of signal contacts and a second cable having a pair of signal wires terminated to the second pair of signal contacts, the unitary ground bar comprising: a first loop for wrapping around the first cable; a second loop for wrapping around the second cable; and an intermediate portion between the first loop and the second loop for terminating to the ground contact.

DETAILED DESCRIPTION OF THE DRAWINGS

Figure 1:
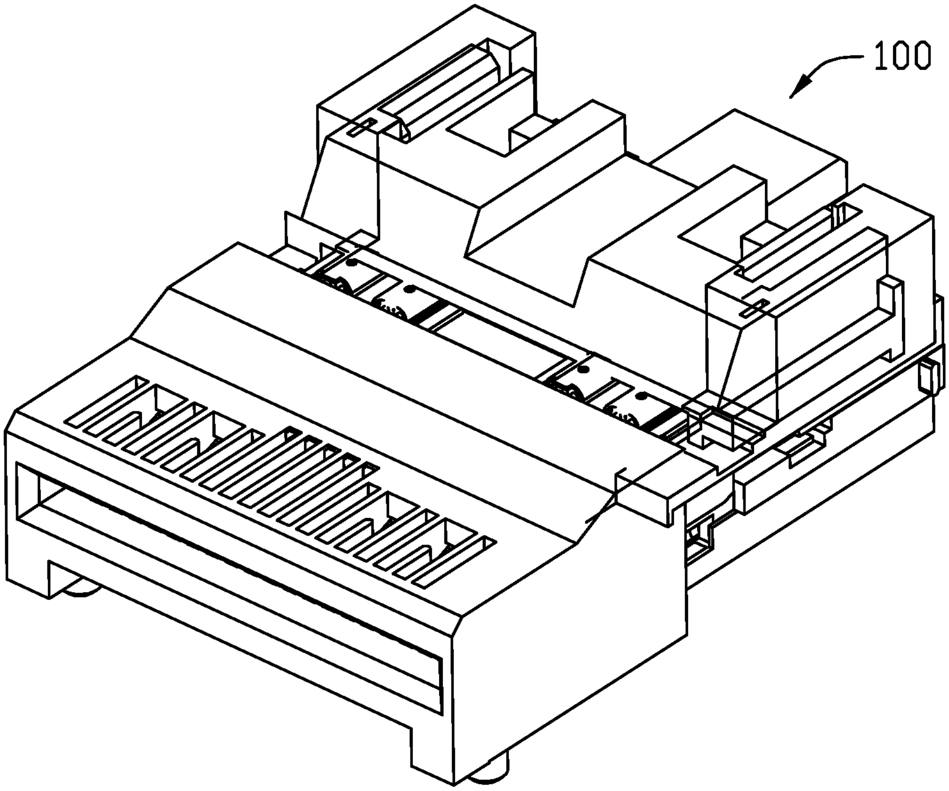
FIG. 1 is a perspective view of an electrical connector assembly in accordance with the present invention.
Figure 2:
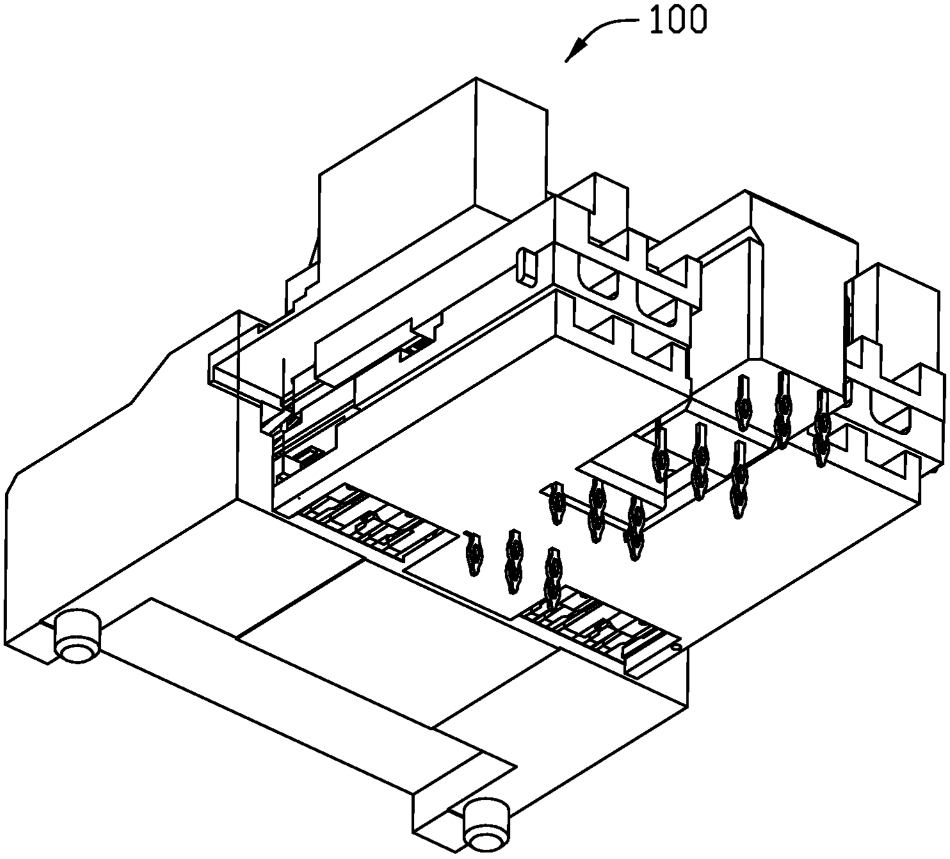
FIG. 2 is another perspective view of the electrical connector assembly.
Figure 3:
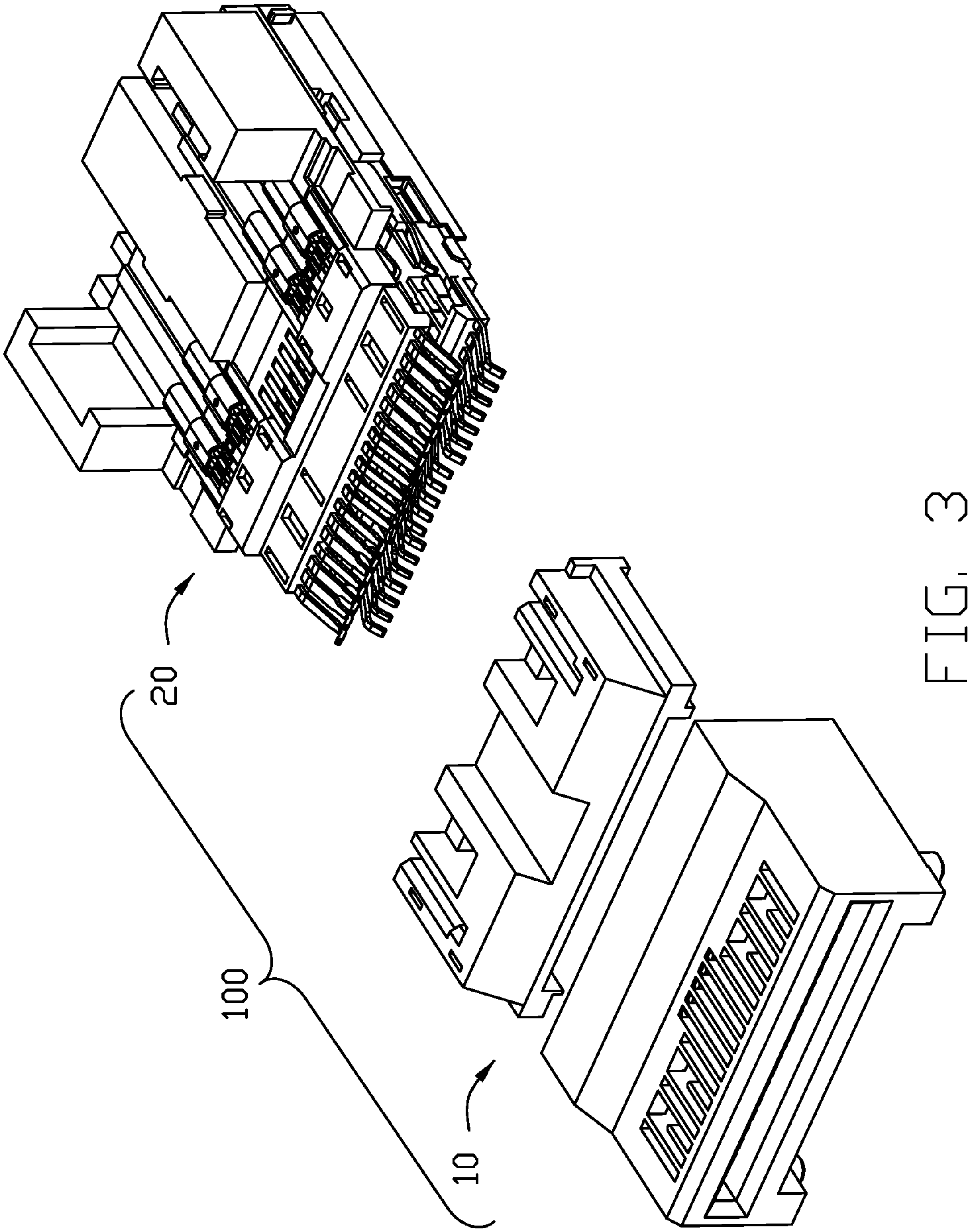
FIG. 3 is an exploded view of the electrical connector assembly.
Figure 4:
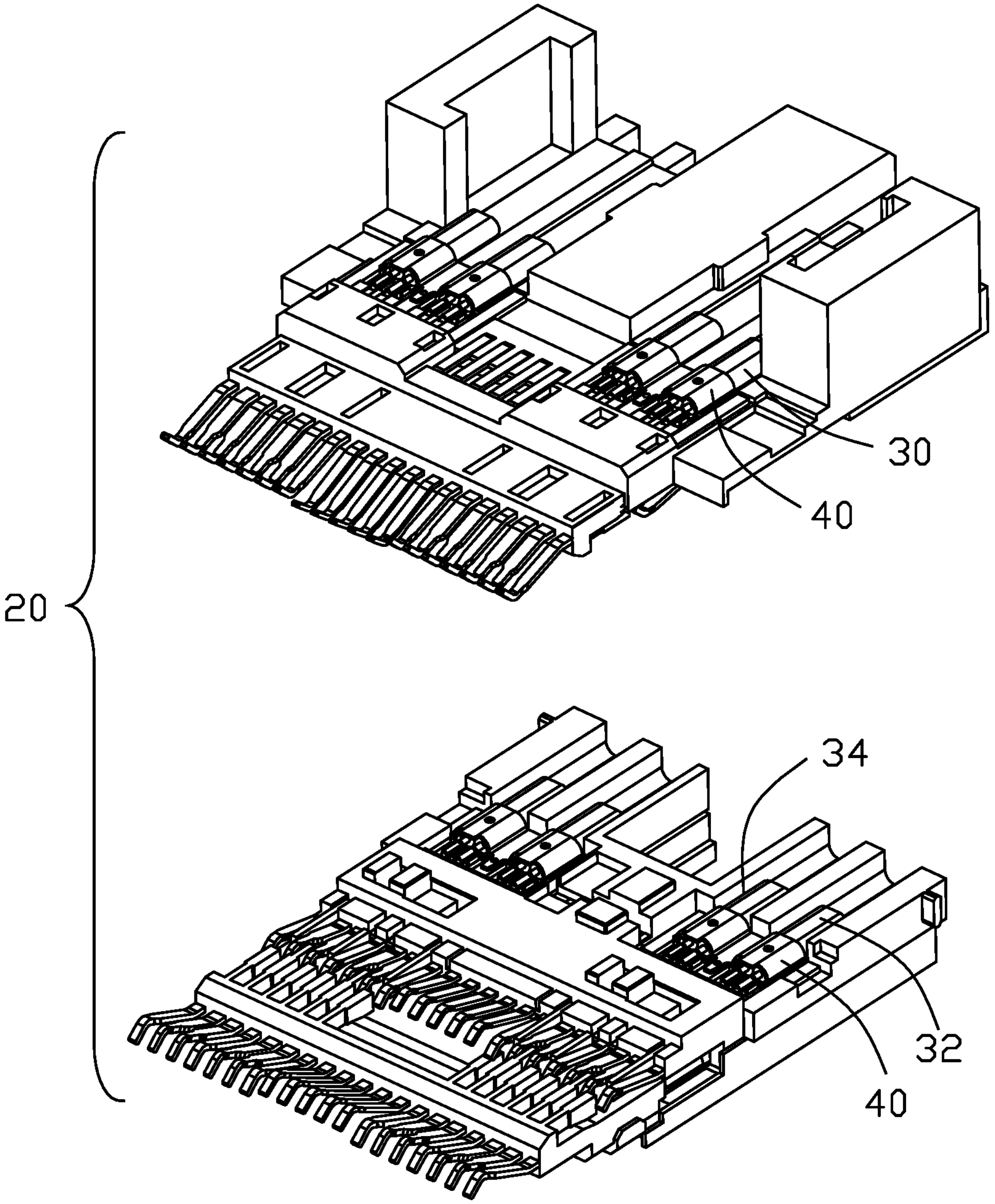
FIG. 4 is an exploded view of a contact module of the electrical connector assembly.

Referring to FIGS. 1-16, an electrical connector assembly 100 comprises an insulative housing 10, a contact module 20 received by the insulative housing 10, plural cables 30 terminated to the contact module 20, and plural ground bars 40. The contact module 20 may include an upper part and a lower part stacked with each other. The upper part may include a front/outer upper unit and a rear/inner upper unit assembled together. Each of the upper units may include a unitary insulative body and a plurality of contacts integrally formed within the insulative body via an insert-molding process. The lower part may be similarly designed and arranged as the upper part, namely, including a front/outer lower unit and a rear/inner lower unit stacked with each other. Each contact may include a contacting portion, a tail, and a intermediate portion between the contacting portion and the tail. Further details concerning the contact module is provided in commonly owned copending U.S. Patent Application No. 63/118,829 filed on Nov. 27, 2020, the content of which is incorporated herein by reference.

In the present invention, the contact module 20, the cables 30, and the ground bars 40 are so designed and arranged that: the contact module 20 includes a first pair of signal contacts 22, a second pair of signal contacts 24, and a ground contact 26 between the first pair of signal contacts 22 and the second pair of signal contacts 24; the cables 30 include a first cable 32 having a pair of signal wires 322 terminated to the first pair of signal contacts 22 and a second cable 34 having a pair of signal wires 342 terminated to the second pair of signal contacts 24; and an associated ground bar 40 is unitary and has a first loop 42 wrapping around the first cable 32, a second loop 44 wrapping around the second cable 34, and an intermediate portion 46 terminated to the ground contact 26.

Figure 5:
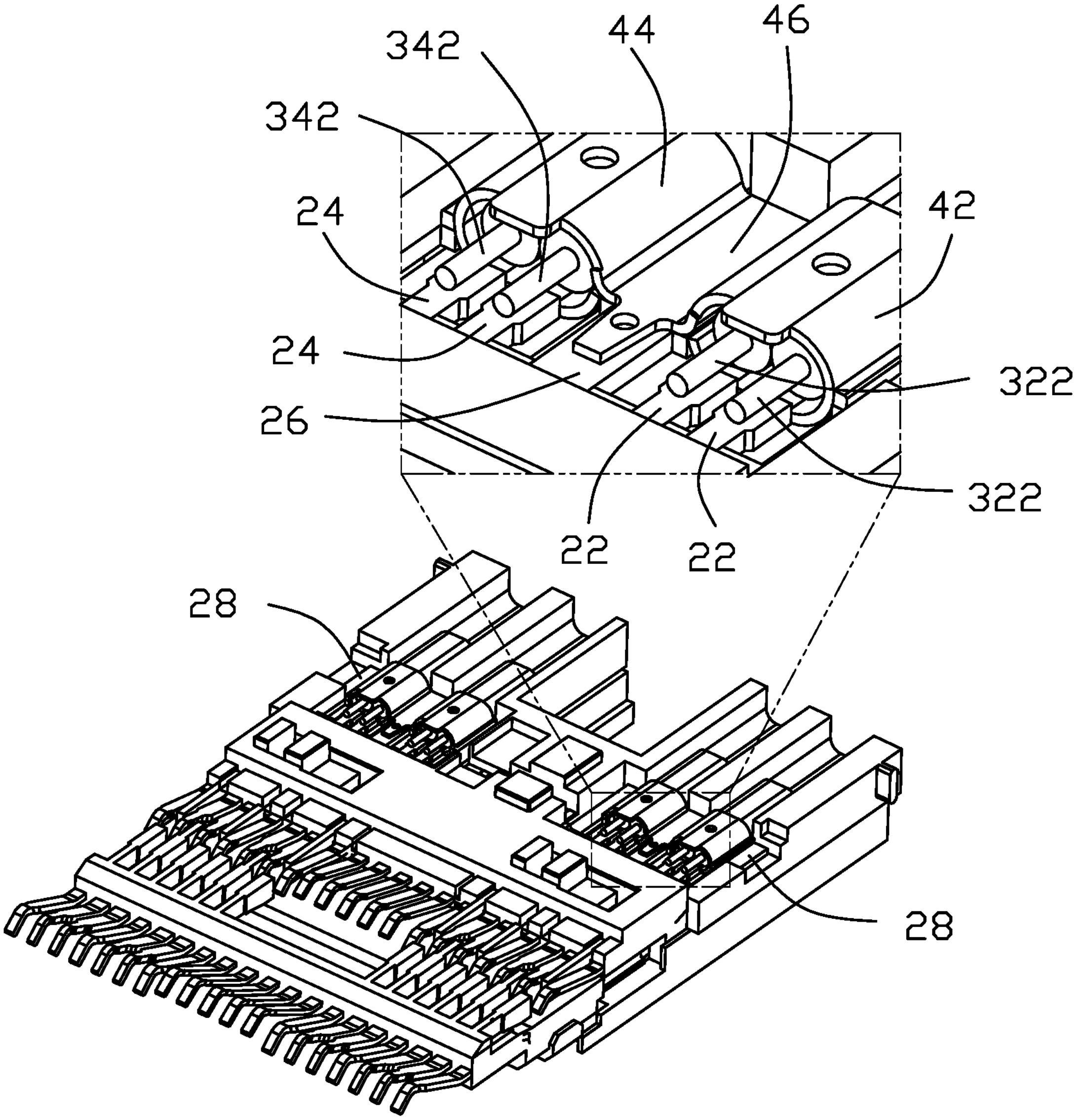
FIG. 5 shows an enlarged view of a part of the contact module.
Figure 6:
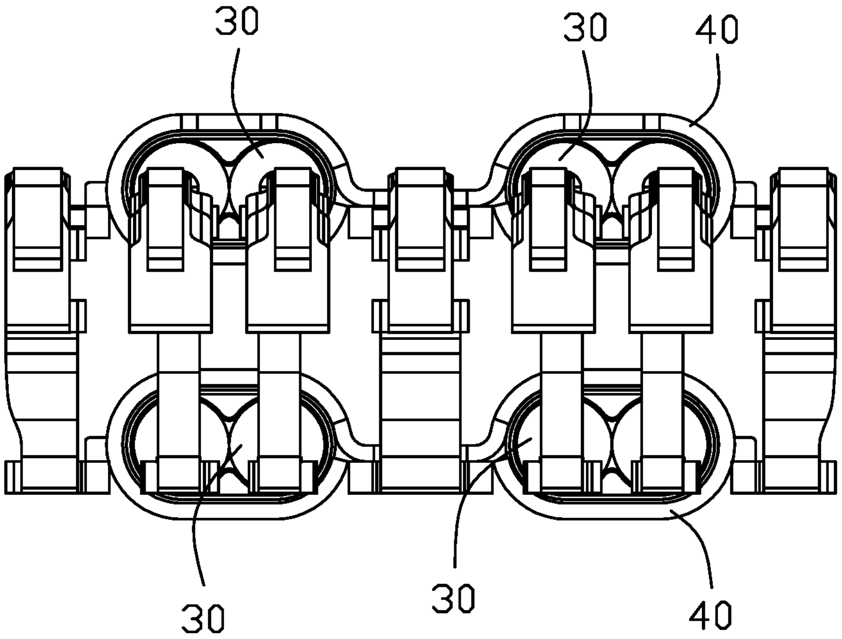
FIG. 6 is a schematic front view of a part of the contact module omitting an insulator thereof.
Figure 10:
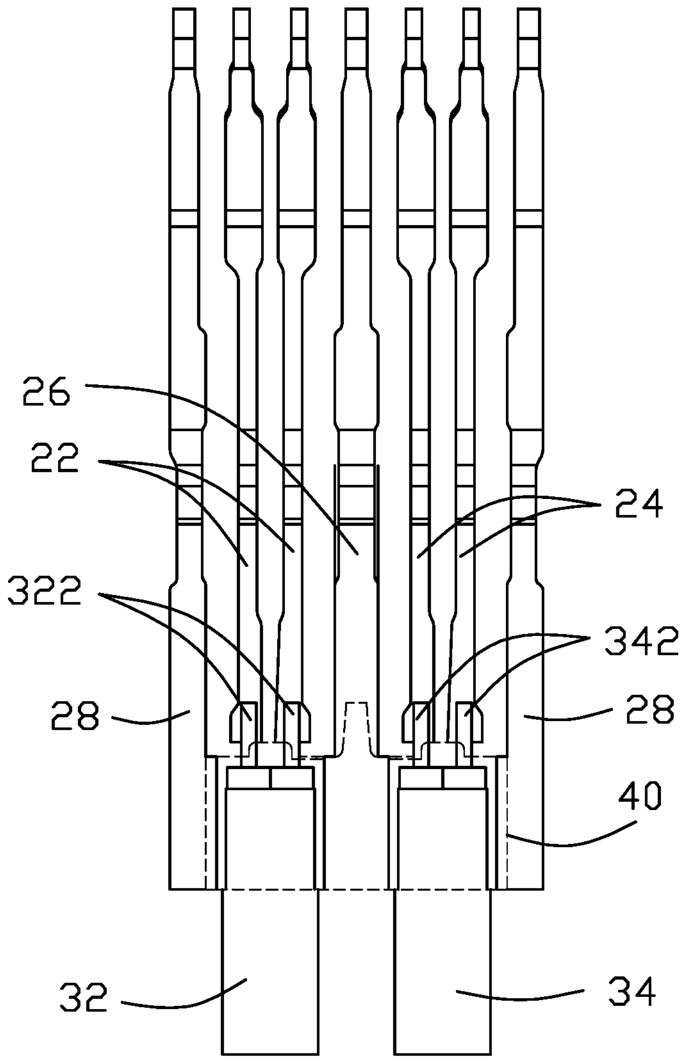
FIG. 10 is a schematic top view showing relationship between the ground bar shown in dotted lines, ground and signal contacts, and cables.
Figure 11:
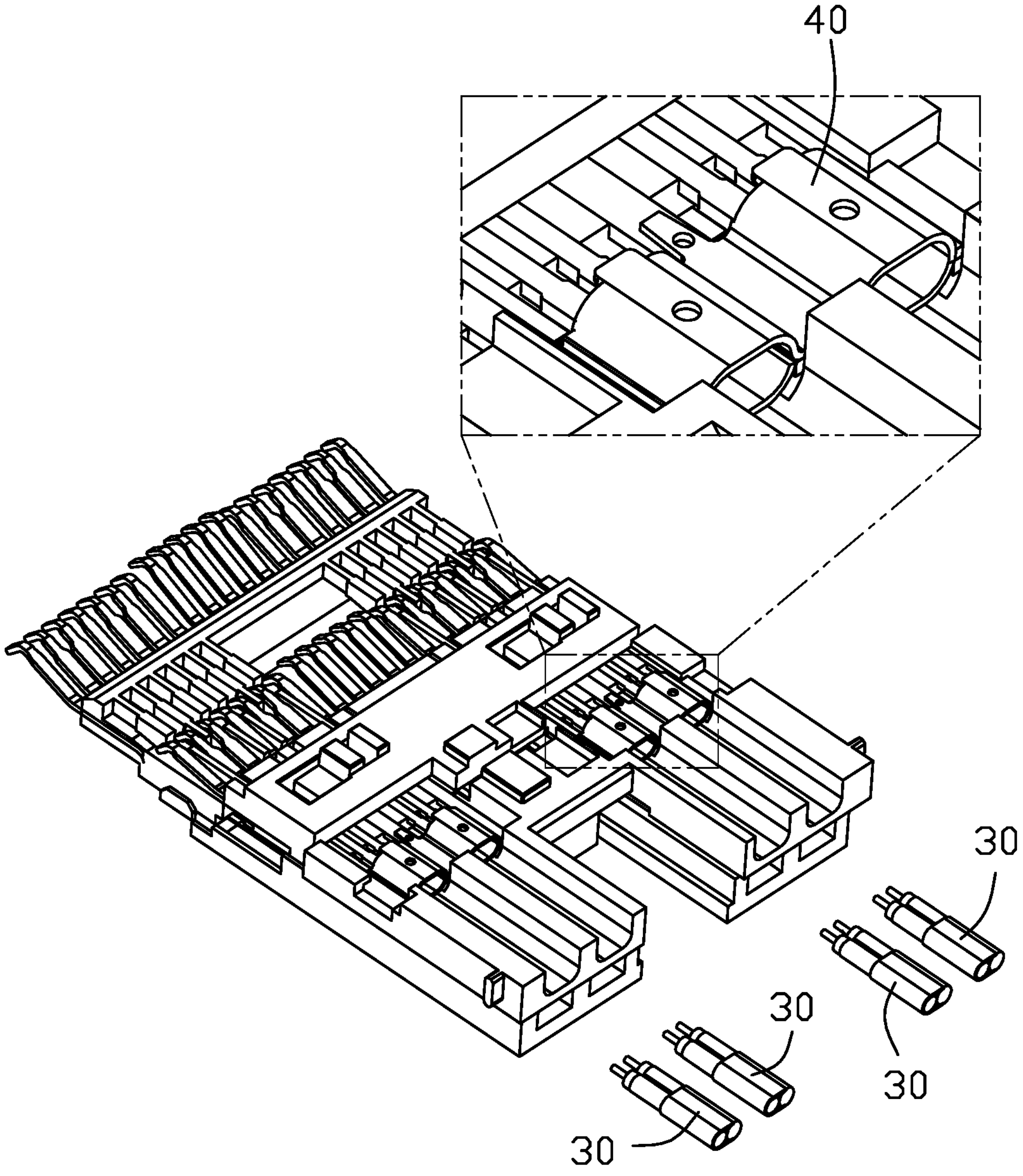
FIG. 11 is an exploded view of the contact module in FIG. 9.
Figure 12:
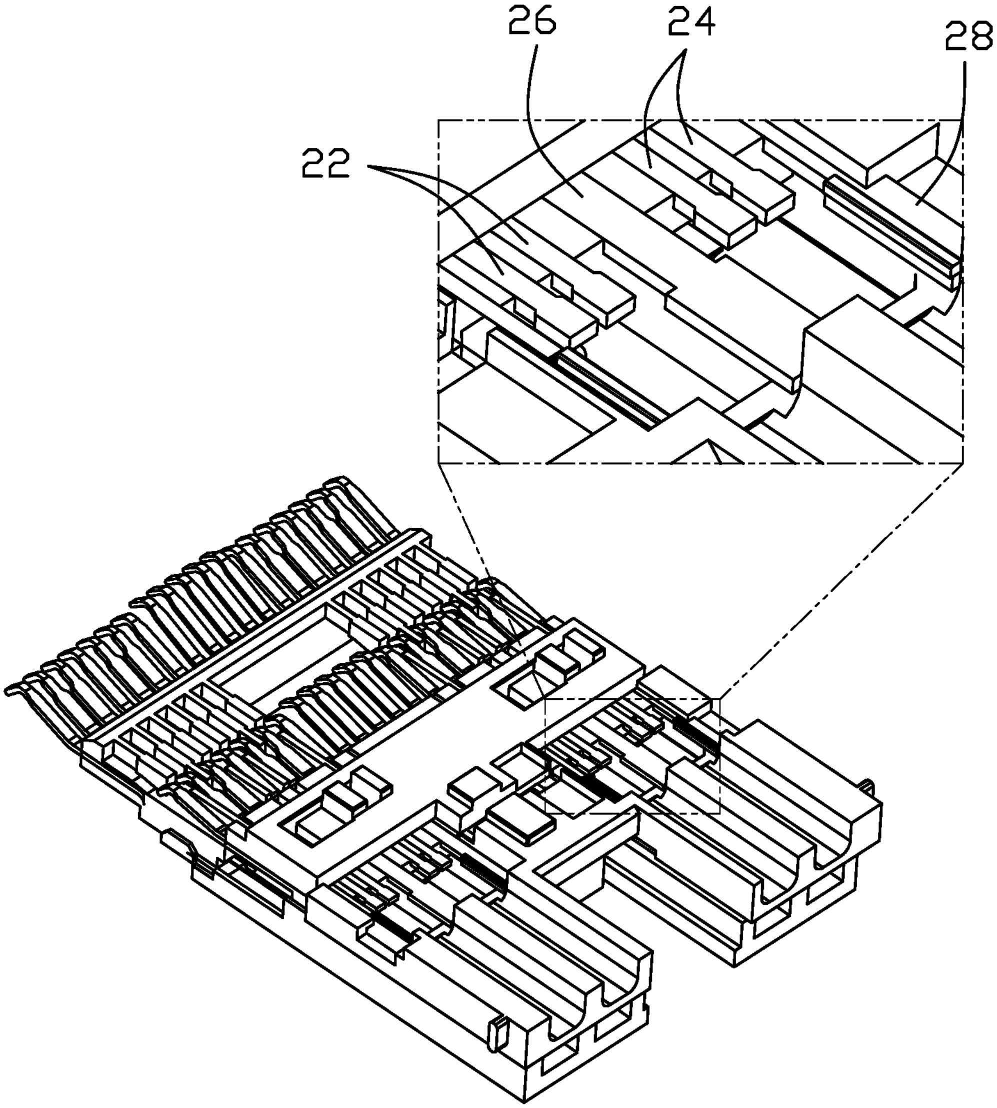
FIG. 12 is a view similar to FIG. 11 but omitting the cables and the ground bars.
Figure 13:
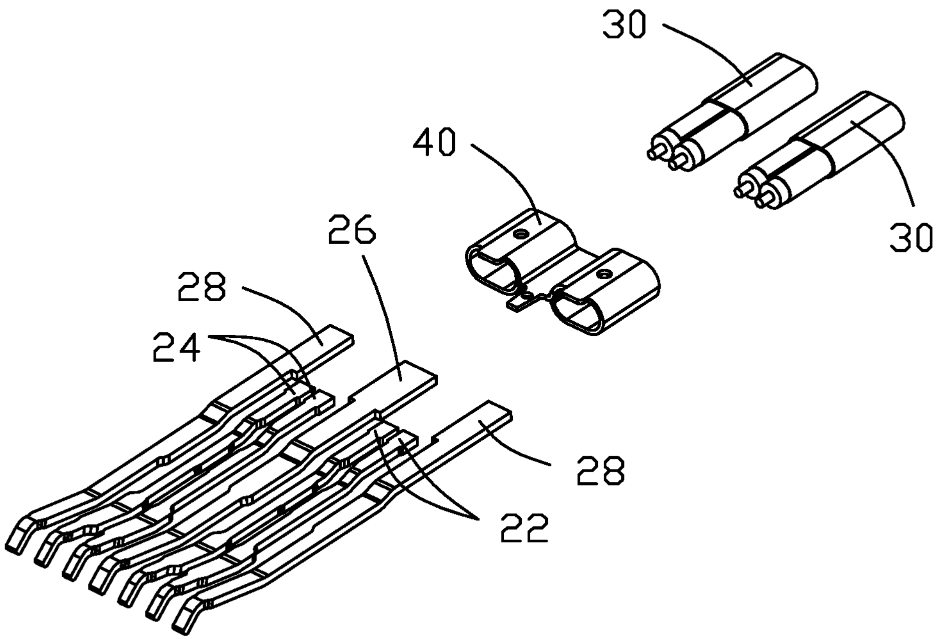
FIG. 13 is a schematic perspective view showing the ground bar, the ground and signal contacts, and the cables.

The present invention mainly concerns the wrap-around ground bar or shield 40 that approaches 360 degrees of shield coverage around the twin-ax cables 30 in a single piece, especially in stripping areas of the cables and preferably at least partially wrapping around exposed ends of the signal wires 322 and 342 as shown in FIGS. 5 and 10. The ground bar 40 is more conformal to the surface of the twin-ax for better impedance control.

Figure 7:
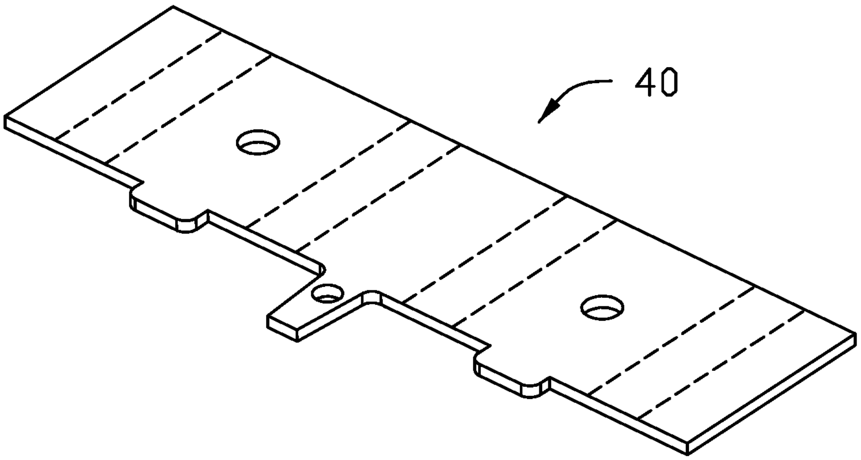
FIG. 7 shows a flat sheet of metal for forming a ground bar of the electrical connector assembly.
Figure 8:
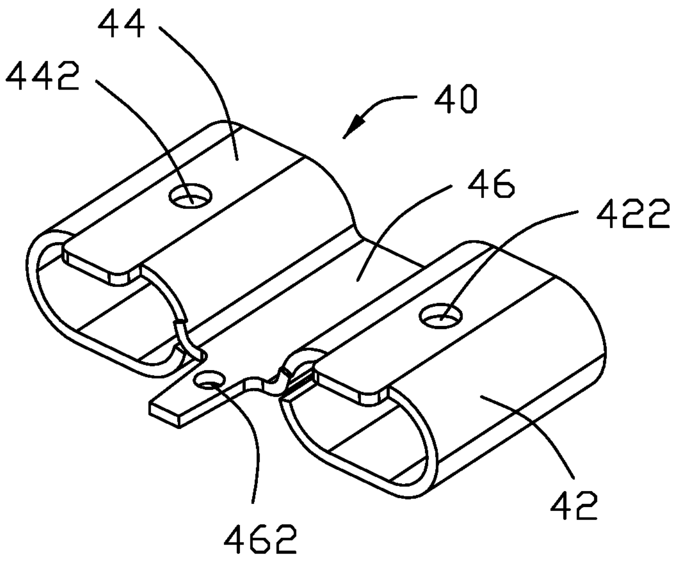
FIG. 8 shows the ground bar.
Figure 9:
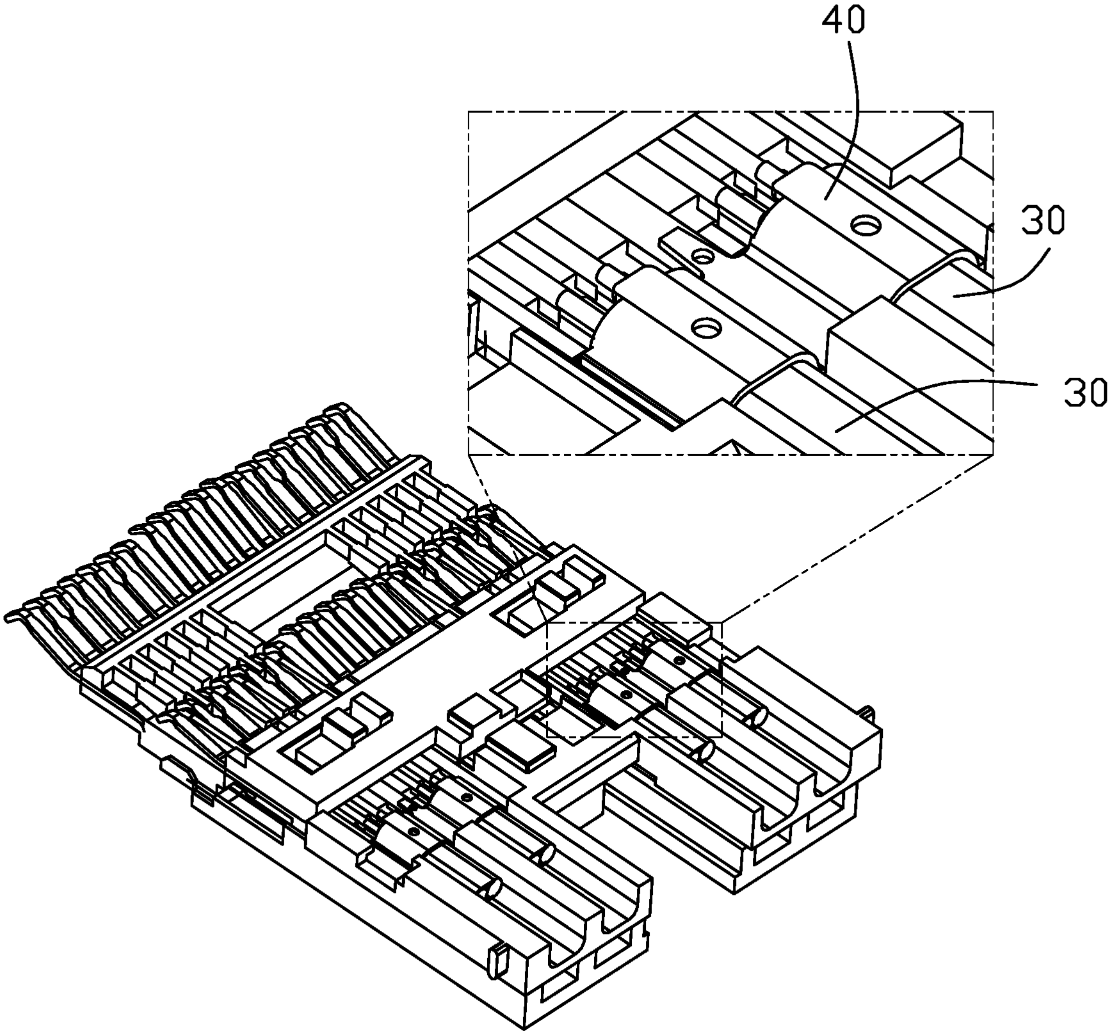
FIG. 9 is a view similar to FIG. 5 but from another perspective.

Referring to FIGS. 7 and 8 in particular, the ground bar 40 is stamped and formed from a flat sheet of metal. During manufacturing, the intermediate portion 46 of the wrap-around ground bar 40 is soldered to the ground contact 26. A hole 462 may be provided on the intermediate portion 46 for assisting in soldering. The contact module 20 may further include two side ground contacts 28 at two outer sides of the first and second pairs of signal contacts 22 and 24, respectively, and the unitary ground bar 40 may be additionally soldered to the two side ground contacts 28. The first and second cables 32 and 34 may then be inserted through the first and second loops 42 and 44, respectively, and the pair of signal wires 322 are soldered to the first pair of signal contacts 22 and the pair of signal wires 342 are soldered to the second pair of signal contacts 24. Respective holes 422 and 442 may be provided on the first and second loops 42 and 44 for direct soldering to cable ground shields. From a design point the ground bar 40 simplifies connector design in that additional clearance space underneath for assembly and assembly access is not needed.

Figure 14:
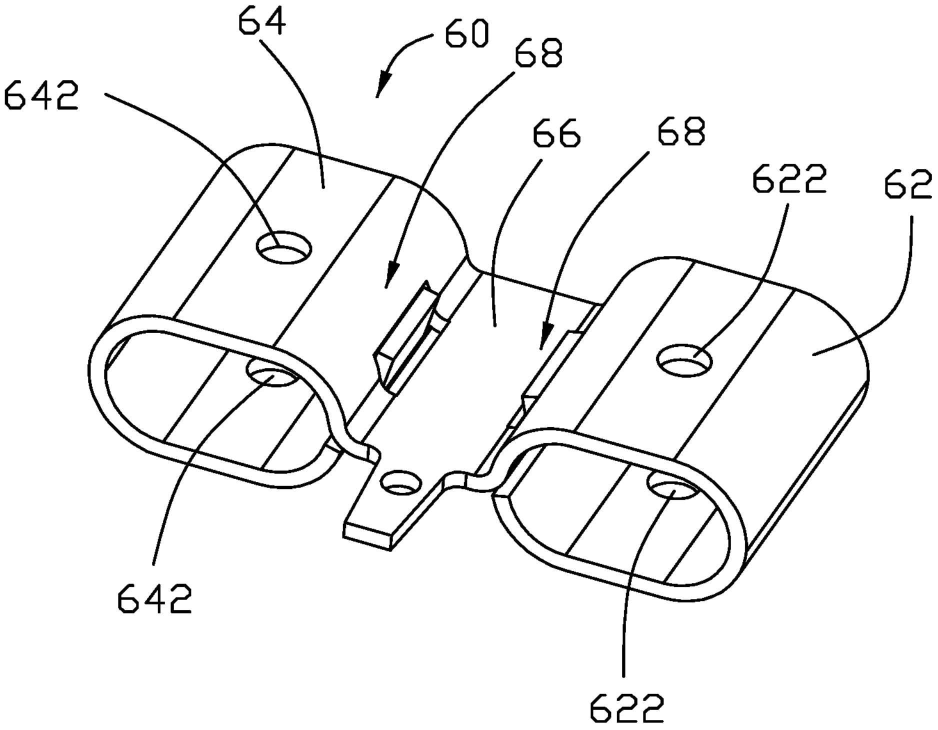
FIG. 14 is a perspective view of a varied ground bar.
Figure 15:
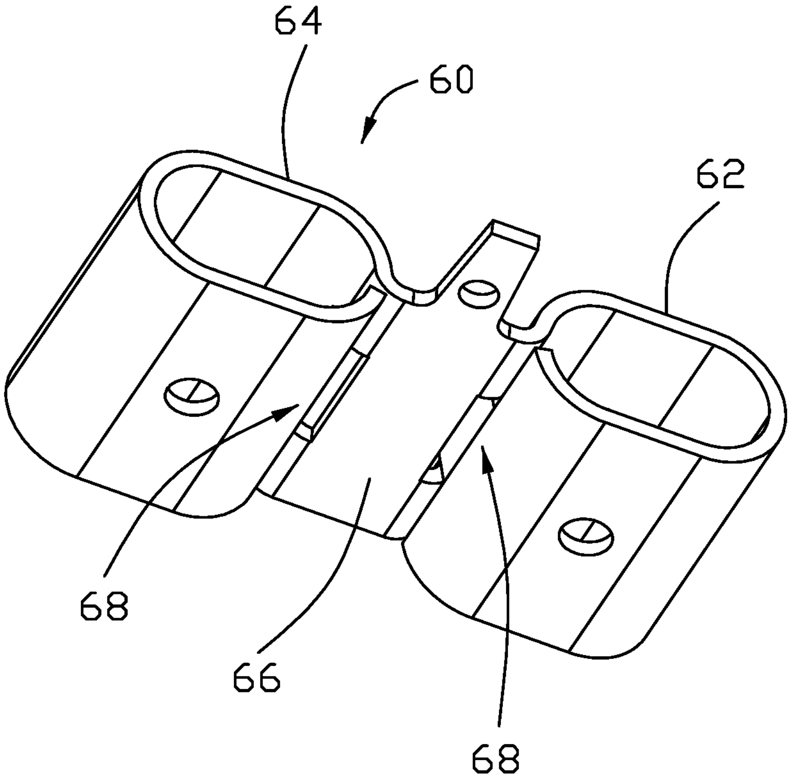
FIG. 15 is another perspective view of the varied ground bar.
Figure 16:
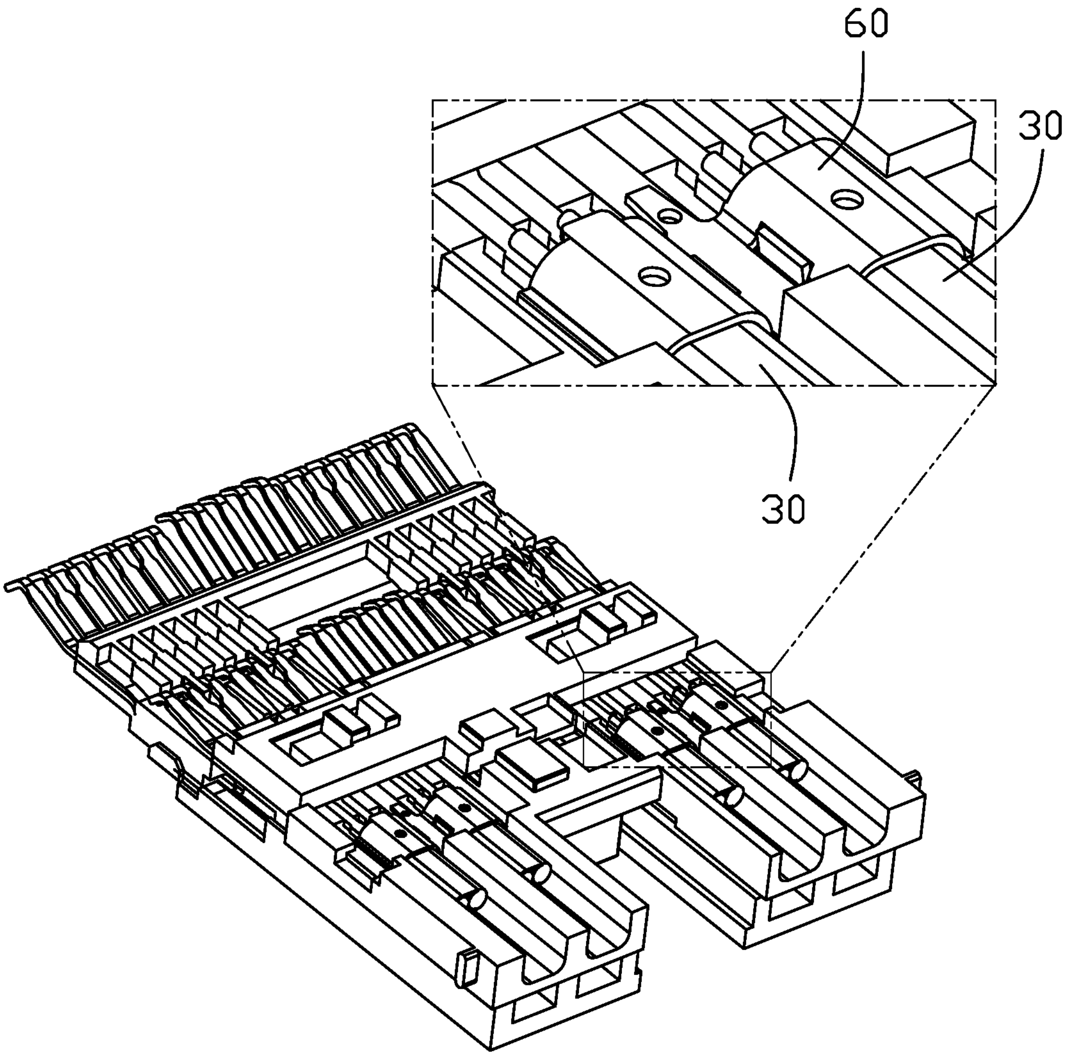
FIG. 16 is a view similar to FIG. 9 but showing the varied ground bar.

FIGS. 14 and 15 show a varied ground bar 60 also stamped and formed from a flat sheet of metal. The ground bar 60 has a respective interlocking feature 68 where each of first and second loops 62 and 64 creates a closed 360-degree shielded loop. If desired, the interlocking feature 68 may be finished by soldering. Holes 622 and 642 may be provided on both top and bottom of the loops 62 and 64. Intermediate portion 66 of the ground bar 60 is substantially flat so holes may be provided thereon for alignment and support during assembly.

The invention claimed is:

1. An electrical connector assembly comprising:
an insulative housing;
a contact module received by the insulative housing, the contact module including a first pair of signal contacts, a second pair of signal contacts, and a ground contact between the first pair of signal contacts and the second pair of signal contacts;
a first cable having a pair of signal wires terminated to the first pair of signal contacts and a second cable having a pair of signal wires terminated to the second pair of signal contacts; and
a unitary ground bar having a first loop wrapping around the first cable, a second loop wrapping around the second cable, and an intermediate portion terminated to the ground contact; wherein
the contact module comprises two side ground contacts at two outer sides of the first and second pairs of signal contacts, respectively, and the first and second loops of the unitary ground bar are soldered to the two side ground contacts, respectively.

2. The electrical connector assembly as claimed in claim 1, wherein each of the first and second loops of the unitary ground bar has an interlocking feature to create a closed 360-degree shielded loop.

3. The electrical connector assembly as claimed in claim 2, wherein the interlocking feature comprises a soldered structure.

4. The electrical connector assembly as claimed in claim 1, wherein the first and second loops of the ground bar at least partially wrapping around exposed ends of the signal wires of the first and second cables, respectively.

5. The electrical connector assembly as claimed in claim 1, wherein the first and second loops of the ground bar are conformal to the surfaces of the first and second cables.

6. The electrical connector assembly as claimed in claim 1, wherein the ground bar is stamped and formed from a flat sheet of metal.

7. The electrical connector assembly as claimed in claim 1, wherein the intermediate portion of the ground bar is soldered to the ground contact.

8. The electrical connector assembly as claimed in claim 7, wherein a hole is provided on the intermediate portion for assisting in soldering.

9. The electrical connector assembly as claimed in claim 1, wherein the first and second loops have respective holes for direct soldering of ground shields of the cables.

10. The electrical connector assembly as claimed in claim 9, wherein the holes are provided on both top and bottom of each of the first loop and the second loop.

11. The electrical connector assembly as claimed in claim 1, wherein the intermediate portion of the ground bar is flat.

12. An electrical connector assembly comprising:
an insulative housing;
a contact module received by the insulative housing, the contact module including a first pair of signal contacts, a second pair of signal contacts, and a ground contact between the first pair of signal contacts and the second pair of signal contacts;
a first cable having a pair of signal wires terminated to the first pair of signal contacts and a second cable having a pair of signal wires terminated to the second pair of signal contacts; and
a unitary ground bar having a first loop wrapping around the first cable, a second loop wrapping around the second cable, and an intermediate portion terminated to the ground contact; wherein
the intermediate portion of the ground bar is soldered to the ground contact; and
a hole is provided on the intermediate portion for assisting in soldering.

13. The electrical connector assembly as claimed in claim 12, wherein the contact module comprises two side ground contacts at two outer sides of the first and second pairs of signal contacts, respectively, and the unitary ground bar is soldered to the two side ground contacts.

14. The electrical connector assembly as claimed in claim 12, wherein the first and second loops of the ground bar at least partially wrap around exposed ends of the signal wires of the first and second cables, respectively.

15. An electrical connector assembly comprising:
an insulative housing;
a contact module received by the insulative housing, the contact module including a first pair of signal contacts, a second pair of signal contacts, and a ground contact between the first pair of signal contacts and the second pair of signal contacts;

a first cable having a pair of signal wires terminated to the first pair of signal contacts and a second cable having a pair of signal wires terminated to the second pair of signal contacts; and a unitary ground bar having a first loop wrapping around the first cable, a second loop wrapping around the second cable, and an intermediate portion terminated to the ground contact; wherein the first and second loops have respective holes for direct soldering of ground shields of the cables.

16. The electrical connector assembly as claimed in claim 15, wherein the contact module comprises two side ground contacts at two outer sides of the first and second pairs of signal contacts, respectively, and the unitary ground bar is soldered to the two side ground contacts.

17. The electrical connector assembly as claimed in claim 15, wherein the first and second loops of the ground bar at least partially wrap around exposed ends of the signal wires of the first and second cables, respectively.

18. An electrical connector assembly comprising: an insulative housing; a contact module received by the insulative housing, the contact module including a first pair of signal contacts, a second pair of signal contacts, and a ground contact between the first pair of signal contacts and the second pair of signal contacts; a first cable having a pair of signal wires terminated to the first pair of signal contacts and a second cable having a pair of signal wires terminated to the second pair of signal contacts; and a unitary ground bar having a first loop wrapping around the first cable, a second loop wrapping around the second cable, and an intermediate portion terminated to the ground contact; wherein the first and second loops of the ground bar at least partially wrap around exposed ends of the signal wires of the first and second cables, respectively; wherein each of the first and second loops of the unitary ground bar has an interlocking feature to create a closed 360-degree shielded loop.

19. The electrical connector assembly as claimed in claim 18, wherein the contact module comprises two side ground contacts at two outer sides of the first and second pairs of signal contacts, respectively, and the unitary ground bar is soldered to the two side ground contacts.

* * * * *